(12) United States Patent
Cain et al.

(10) Patent No.: US 9,490,917 B2
(45) Date of Patent: Nov. 8, 2016

(54) DERIVED RECEIVE SIGNAL PROCESSING

(75) Inventors: Lawrence Cain, Preston (GB); Simon Russell Radford, Hyde (GB)

(73) Assignee: BAE SYSTEMS PLC, London (GB)

( * ) Notice: Subject to any disclaimer, the term of this patent is extended or adjusted under 35 U.S.C. 154(b) by 168 days.

(21) Appl. No.: 13/995,866

(22) PCT Filed: Dec. 21, 2011

(86) PCT No.: PCT/GB2011/052541
§ 371 (c)(1),
(2), (4) Date: Jun. 19, 2013

(87) PCT Pub. No.: WO2012/085566
PCT Pub. Date: Jun. 28, 2012

(65) Prior Publication Data
US 2013/0295851 A1 Nov. 7, 2013

(30) Foreign Application Priority Data

Dec. 21, 2010 (EP) ..................................... 10275132
Dec. 21, 2010 (GB) ................................... 1021543.2

(51) Int. Cl.
*H04B 1/00* (2006.01)
*H04B 15/00* (2006.01)
*H04B 1/525* (2015.01)

(52) U.S. Cl.
CPC .............. *H04B 15/00* (2013.01); *H04B 1/525* (2013.01)

(58) Field of Classification Search
CPC ........... H04B 15/00; H04B 1/00; H04B 1/16
USPC .................... 455/63.1, 63.3, 73, 41.2, 307
See application file for complete search history.

(56) References Cited

U.S. PATENT DOCUMENTS

| 6,023,609 | A | * | 2/2000 | Futamura | ............... | H04B 1/525 333/129 |
|---|---|---|---|---|---|---|
| 6,442,375 | B1 | | 8/2002 | Parmentier | | |
| 7,053,845 | B1 | | 5/2006 | Holloway et al. | | |
| 2001/0049267 | A1 | * | 12/2001 | Takalo | ................ | H04B 1/0028 455/84 |
| 2006/0135071 | A1 | * | 6/2006 | Kim | .................... | H04B 1/1036 455/63.1 |

(Continued)

FOREIGN PATENT DOCUMENTS

DE     3618170 A1    12/1987
EP     1 675 270 A2    6/2006

(Continued)

OTHER PUBLICATIONS

International Search Report (PCT/ISA/210) issued on Mar. 29, 2012, by the European Patent Office as the International Searching Authority for International Application No. PCT/GB2011/052541.

(Continued)

*Primary Examiner* — MD Talukder
(74) *Attorney, Agent, or Firm* — Maine Cernota & Rardin

(57) ABSTRACT

Apparatus for and method of processing radio frequency signals, the method including: obtaining a signal indicative of a first frequency (e.g. by obtaining a sample of a transmitted signal), the first frequency being a frequency of the transmitted signal; and using the signal indicative of a first frequency, establishing a second frequency depending on the first frequency, the second frequency being a frequency to which to tune a filter for filtering a received signal. An antenna for receiving and/or transmitting a signal may be a co-site antenna with respect to at least one other antenna.

16 Claims, 8 Drawing Sheets

(56) References Cited

U.S. PATENT DOCUMENTS

| | | | |
|---|---|---|---|
| 2006/0178111 A1* | 8/2006 | Choi | H04B 1/109 455/63.1 |
| 2007/0082622 A1* | 4/2007 | Leinonen | H04B 1/005 455/78 |
| 2008/0194211 A1* | 8/2008 | Suehiro | H04L 23/02 455/75 |
| 2008/0266103 A1* | 10/2008 | Chen | G06K 7/0008 340/572.7 |
| 2009/0156152 A1* | 6/2009 | Sahota | H04B 1/18 455/296 |
| 2009/0286569 A1* | 11/2009 | Rousu | H01P 1/213 455/553.1 |
| 2010/0029204 A1 | 2/2010 | Gao | |
| 2010/0120385 A1* | 5/2010 | LeSage | H03F 1/0272 455/127.1 |
| 2010/0136925 A1 | 6/2010 | Lackey | |
| 2010/0136941 A1* | 6/2010 | Lackey | H04B 1/525 455/307 |
| 2010/0323643 A1* | 12/2010 | Ridgers | H03L 7/0994 455/118 |
| 2011/0053544 A1* | 3/2011 | Wenink | H04B 1/005 455/255 |
| 2011/0200322 A1* | 8/2011 | Kovsh | H04J 14/0209 398/2 |
| 2013/0015998 A1* | 1/2013 | Jones | G01S 13/9303 342/30 |
| 2013/0295851 A1* | 11/2013 | Cain | H04B 1/525 455/63.3 |

FOREIGN PATENT DOCUMENTS

| | | |
|---|---|---|
| WO | WO01/06669 A1 | 1/2001 |
| WO | WO 2006/068635 A1 | 6/2006 |
| WO | WO 2007/148143 A1 | 12/2007 |

OTHER PUBLICATIONS

United Kingdom Search Report for GB 1021543.2 dated Apr. 20, 2011.

European Search Report for 10275132.8 dated May 24, 2011.

* cited by examiner

DERIVED RECEIVE SIGNAL PROCESSING

RELATED APPLICATIONS

This application is a national phase application filed under 35 USC §371 of PCT Application No. PCT/GB2011/052541 with an International filing date of Dec. 21, 2011 which claims priority of EP Patent Application 10275132.8 filed Dec. 21, 2010 and GB Patent Application 1021543.2 filed Dec. 21, 2010. Each of these applications is herein incorporated by reference in their entirety for all purposes.

FIELD OF THE INVENTION

The present invention relates to processing radio frequency signals.

BACKGROUND

Typically, reliable communications facilitate the effective operation of some systems. For example, radio communication between an aircraft and a base on the ground facilitate for safe operation of the aircraft and mission success.

Many aircraft utilise a number of communication and data link systems to enable them to carry out their missions. Typically, these systems are connected to one or more dedicated antennas. The proximity of these antennas to each other, especially on an aircraft with space restrictions, can create a phenomenon known as "co-site" interference.

Serious problems can occur when a transmitter antenna is located within the vicinity of a receiver antenna. In particular, weak or distant signals that a receiver is normally capable of receiving may be lost in the low-level broadband noise created by a co-site transmitter. This effect is referred to as "receiver de-sensitisation".

One solution to the problem of receiver desensitisation is to increase antenna RF isolation by increasing the spatial separation of receiving and transmitting antennas. However, this is not always possible on platforms which are of limited size.

Another solution to the problem of receiver desensitisation is to use an RF filter for both the transmitters and receivers. Receivers are filtered so that they only receive a specified bandwidth at the chosen frequency, while transmitters are filtered to reduce broadband noise and sidebands. However, the filters used in this configuration tend to be large, heavy, expensive, and consume relatively large amounts of aircraft power. Furthermore, the filter installations tend to be bespoke and have to be adapted to the particular type of aircraft. Also, the filters themselves generally require software and hardware integration with the donor radio system allowing access to the radio tuning bus and discrete signals. Thus, the filter installations cannot be transferred to other radio systems in the event of a platform radio upgrade, equipment obsolescence update etc.

SUMMARY OF THE INVENTION

In a first aspect, the present invention provides a method of processing radio frequency signals to be received by a transceiver module, the method comprising: obtaining a signal indicative of a first frequency, the first frequency being a frequency of a signal transmitted by the transceiver module operating in a transmit mode; and using the signal indicative of a first frequency, establishing a second frequency depending on the first frequency, the second frequency being a frequency to which to tune a filter (28, 32) for filtering a signal to be received by the transceiver module operating in a receive mode.

The invention may provide a method of processing radio frequency signals, the method comprising: obtaining a signal indicative of a first frequency, the first frequency being a frequency of a transmitted signal; and using the signal indicative of a first frequency, establishing a second frequency depending on the first frequency, the second frequency being a frequency to which to tune a filter for filtering a received signal.

The method may further comprise transmitting a signal to provide the transmitted signal.

The method may further comprise tuning the filter for filtering a received signal depending on the second frequency.

Obtaining a signal indicative of a first frequency may comprise obtaining a sample of the transmitted signal.

Establishing the second frequency may comprise: using a voltage controlled oscillator, generating a signal having variable frequency; using a multiplier, multiplying the signal generated by the voltage controlled oscillator and the signal indicative of a first frequency; and determining the first frequency depending on an output from the multiplier.

The second frequency may be substantially equal to the first frequency.

The method may further comprise receiving a signal at a receiver antenna to provide the received signal, and filtering the received signal using the filter.

The method may further comprise emitting the transmitted signal from a transmission antenna, and the step of obtaining a signal indicative of a first frequency may be performed prior to the transmitted signal being emitted from the transmission antenna.

The receiver antenna may be the same antenna as the transmission antenna.

An antenna may be a co-site antenna with respect to at least one other antenna.

The method may further comprise: performing a fault detection process, and the step of filtering the received signal using the filter is only performed if no fault is detected.

In a further aspect, the present invention provides apparatus for processing radio frequency signals, the apparatus having two modes of operation and being configured to be connected to a transceiver module, the apparatus comprising: means for receiving a signal indicative of a first frequency in a transmit mode of operation, the signal being a transmitted signal originating from the transceiver module and the first frequency being a frequency of the transmitted signal; and means for, using the signal indicative of a first frequency, establishing a second frequency depending on the first frequency, the second frequency being a frequency to which to tune a filter (28, 32) for filtering a signal received by the apparatus when the apparatus is in a receive mode of operation.

The invention may provide apparatus for processing radio frequency signals, the apparatus comprising: means for obtaining a signal indicative of a first frequency, the first frequency being a frequency of a transmitted signal; and means for, using the signal indicative of a first frequency, establishing a second frequency depending on the first frequency, the second frequency being a frequency to which to tune a filter for filtering a received signal.

The apparatus may further comprise a filter, wherein the filter is tuned depending on the second frequency. The apparatus may further comprise routing means, the routing means being configured to allow a signal to bypass the filter in a first mode of operation and to route a signal through the filter in a second mode of operation.

In a further aspect, the present invention provides a program or plurality of programs arranged such that when executed by a computer system or one or more processors it/they cause the computer system or the one or more processors to operate in accordance with any of the above aspects.

In a further aspect, the present invention provides a machine readable storage medium storing a program or at least one of the plurality of programs according to the above aspect.

DETAILED DESCRIPTION

Figure 1:
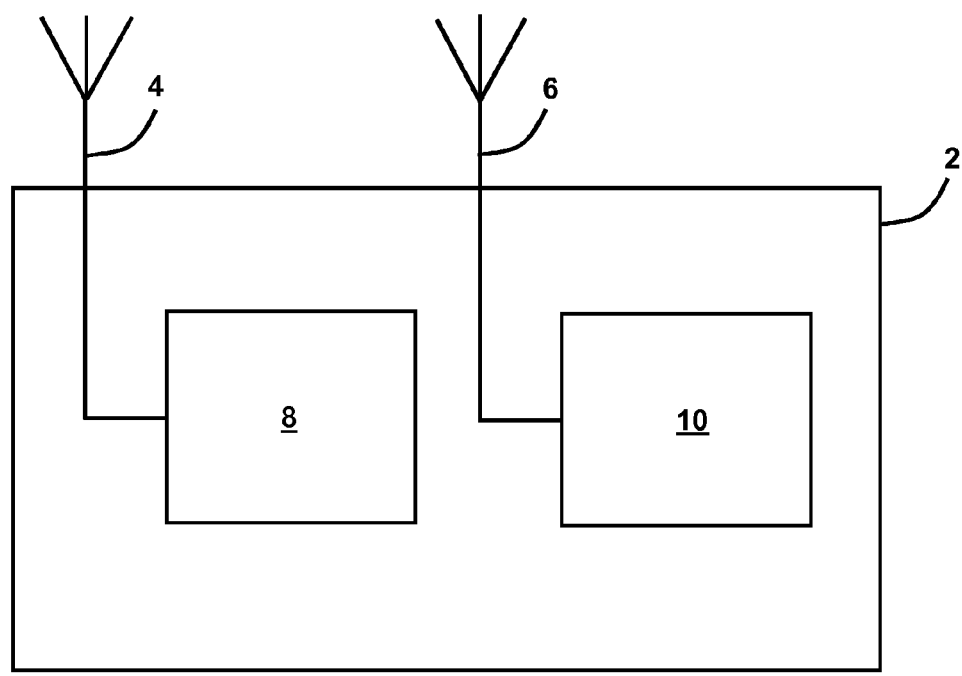
FIG. 1 is a schematic illustration (not to scale) of an example of an aircraft in which an embodiment of a radio frequency (RF) transceiver module is implemented.

FIG. 1 is a schematic illustration (not to scale) of an example of an aircraft 2 in which an embodiment of a radio frequency (RF) transceiver module, hereinafter referred to as a transceiver module, is implemented.

In this example, the aircraft 2 systems comprises a first antenna 4, a second antenna 6, a first transceiver module 8, and a second transceiver module 10.

In this example, the first antenna 4 is coupled to the first transceiver module 8. The first antenna 4 is arranged to transmit signals received from the first transceiver module 8, for example signals sent from an operator (not shown in FIG. 1) of the aircraft 2 via the first transceiver module 8 to the first antenna 4. Also, the first antenna 4 is arranged to receive signals, e.g. from a source remote from the aircraft 2, and send a corresponding signal to the first transceiver module 8. The signal is then, for example, processed and sent to the operator within the aircraft 2.

In this example, the second antenna 6 is coupled to the second transceiver module 10. The second antenna 6 is arranged to transmit signals received from the second transceiver module 10, for example signals sent from the operator of the aircraft 2 via the second transceiver module 10 to the second antenna 6. Also, the second antenna 6 is arranged to receive signals, e.g. from a source remote from the aircraft 2, and send a corresponding signal to the second transceiver module 10. The signal is then, for example, processed and sent to the operator of the aircraft 2.

Each transceiver module 8, 10 is thus able to operate in both a first mode, a transmit mode and a second mode, a receive mode.

The first antenna 4 and the second antenna 6 may be considered to be co-site antennas.

For the purpose of ease of understanding the invention, in the following description the first antenna 4 receives a signal from a source remote from the aircraft 2. At the same time as the first antenna 4 is receiving that signal, the second antenna 6 is transmitting a signal.

In this case, low-level broadband noise resulting from the transmitting of the signal by the second antenna 6 may exceed the sensitivity level of the receiver 8, i.e. when connected to the first antenna 4. Thus, weak, or distant, signals that are otherwise capable of being received at the first antenna may be lost in the noise created by the co-site transmitter, i.e. the second antenna 6 coupled to transceiver module 10.

Figure 2:
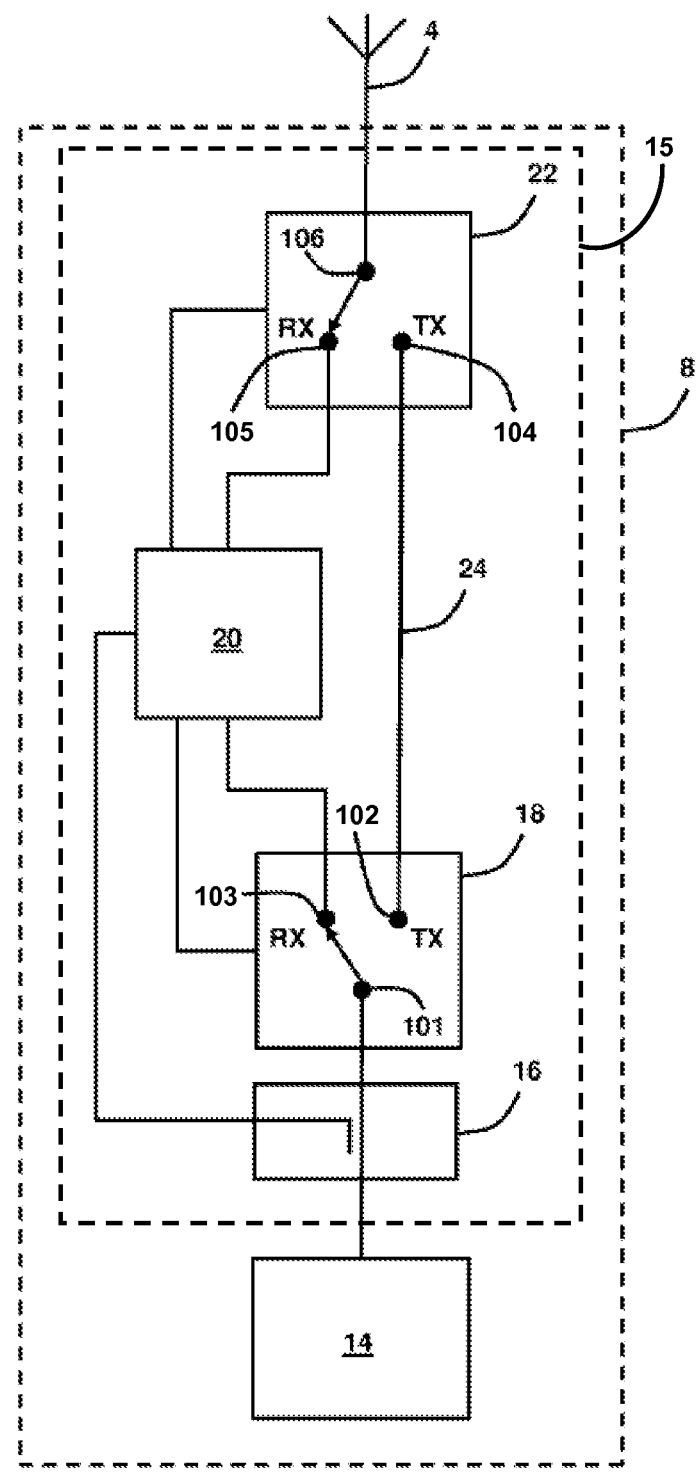
FIG. 2 is a schematic illustration (not to scale) of an antenna and an embodiment of a transceiver module.

FIG. 2 is a schematic illustration (not to scale) of the first antenna 4 and an embodiment of the first transceiver module 8.

In this embodiment, the first transceiver module 8 comprises a transceiver 14 and a protection module 15. The protection module 15 comprises a power sensor 16, a first relay 18, a filter module 20, and a second relay 22.

The transceiver 14 is a radio frequency (RF) transmitter-receiver, preferably a standard transceiver.

In the protection module 15, the first relay 18 comprises three contacts, hereinafter referred to as the first contact 101, the second contact 102, and the third contact 103.

The filter module 20 will be described in more detail later below with reference to FIGS. 4 and 5.

The second relay 22 comprises three contacts, hereinafter referred to as the fourth contact 104, the fifth contact 105, and the sixth contact 106.

In this embodiment, the transceiver 14 is coupled to the first contact 101 of the first relay 18 via the power sensor 16. The power sensor 16 is a sensor adapted to sample a signal originating at the transceiver 14 (i.e. for transmission from the first antenna 4). This sample signal is indicative of a level of power, and the frequency, of the signal to be transmitted. This sample signal is provided to the filter module 20 as described in more detail later below.

In this embodiment the first contact 101 of the first relay 18 may be connected to either the second contact 102 or the third contact 103. In other words, the first relay 18 is a switch that may switch between a first mode and a second mode, the first mode of the first relay 18 being when the first contact 101 is connected to the second contact 102, and the second mode of the first relay 18 being when the first contact 101 is connected to the third contact 103.

In operation, the first contact 101 is connected to the second contact 102 when a signal is being transmitted from the first antenna 4. Thus, the first relay 18, when operating in its first mode may conveniently be referred to as operating in its "transmit mode". Also, the first contact 101 is connected to the third contact 103 when a signal is being received at the first antenna 4 (i.e. as is the case in this embodiment and shown in FIG. 2). Thus, the first relay 18, when operating in its second mode may conveniently be referred to as operating in its "receive mode".

In this embodiment, the third contact 103 of the first relay 18 is coupled to the filter module 20. Also, the filter module 20 is coupled to the power sensor 16 such that a sample signal sampled by the power sensor 16 is received by the filter module 20 from the power sensor 16. Also, the filter module 20 is coupled to the fifth contact 105 (of the second relay 22).

In this embodiment, the second contact 102 of the first relay 18 is coupled to the fourth contact 104 (in the second relay 22). The connection between the second contact 102 and the fourth contact 104 is hereinafter referred to as "the by-pass path 24". The terminology "by-pass path" is used because a signal travelling along this connection by-passes the filter module 20, as described in more detail later below.

In this embodiment the sixth contact 106 (in the second relay 22) may be connected to either the fourth contact 104 or the fifth contact 105. In other words, the second relay 22 is a switch that may switch between a first mode and a second mode, the first mode of the second relay 22 being when the sixth contact 106 is connected to the fourth contact 104, and the second mode of the second relay 22, being when the sixth contact 106 is connected to the fifth contact 105.

In operation, the sixth contact 106 is connected to the fourth contact 104 when a signal is being transmitted from the first antenna 4. Thus, the second relay 22, when operating in its first mode may conveniently be referred to as operating in its "transmit mode". Also, the sixth contact 106 is connected to the fifth contact 105 when a signal is being received at the first antenna 4 (i.e. as is the case in this embodiment and shown in FIG. 2). Thus, the second relay 22, when operating in its second mode may conveniently be referred to as operating in its "receive mode".

In this embodiment, the filter module 20 is connected to the first relay 18 and the second relay 22 such that a control signal can be sent from the filter module 20 to the first relay 18 and/or the second relay 22, as described in more detail later below with reference to FIG. 4.

In this embodiment, the second transceiver module 10 comprises substantially the same type of components to those in the first transceiver module 8. In this embodiment, the second antenna 6 transmits a signal sent to it from the second transceiver module 10.

In this embodiment, the components of the second transceiver module 10 are coupled together in substantially the same way as those components of the first transceiver module 8. However, the relays in the second transceiver module 10 are configured such that a signal sent from the transceiver in the second transceiver module 10 to the second antenna 6 (for transmission) by-pass the filter module of the second transceiver module 10. In other words, the signal sent from the transceiver in the second transceiver module 10 to the second antenna 6 travels along the by-pass path of the second transceiver module 10. Thus, the relays of the second transceiver module 10 are in transmit mode. The second transceiver module 10 is thus, also, in a transmit mode.

Figure 3:
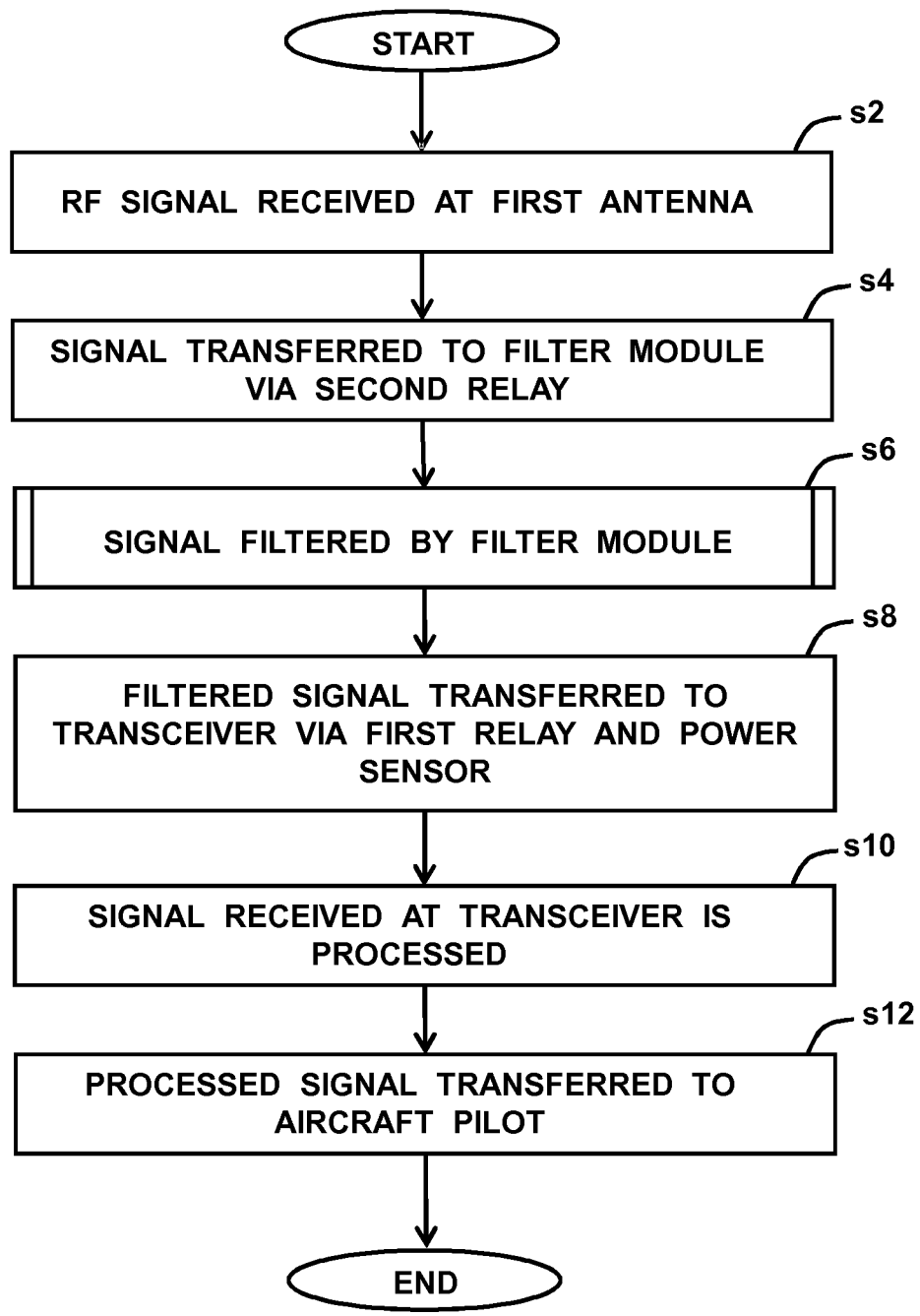
FIG. 3 is a process flow-chart showing certain steps of a process of receiving and processing a radio signal at an antenna.

FIG. 3 is a process flow-chart of certain steps of a process of receiving and processing a radio signal at the first antenna 4.

At step s2, an RF signal is received at the first antenna 4.

At step s4, a signal corresponding to the received RF signal is sent to the filter module 20 via the second relay 22. In this embodiment, the second relay 22 is in receive mode, thus the signal is transferred through the second relay 22 via the sixth contact 106 and the fifth contact 105.

At step s6, the signal received at the filter module 20 is filtered.

The filtering of the received signal by the filter module 20 is described in more detail later below with reference to FIGS. 4 to 9.

At step s8, the signal filtered by the filter module 20 is transferred from the filter module 20 to the transceiver 14.

In this embodiment, the filtered signal is sent via the first relay 18. In this embodiment, the first relay 18 is in receive mode, thus the received signal is transferred via the first and third contacts.

At step s10, the signal received by the transceiver 14 is processed. In this embodiment, the signal is processed to be in a format that is useful for the aircraft pilot.

At step s12, the processed signal is transferred to the pilot of the aircraft 2, who may act accordingly.

Thus, a process by which an RF signal is received by the first antenna 4, filtered/processed, and then the provided to the pilot in a useful form, is provided.

What will now be described are certain components of the filter module 20 and a process by which the filter module 20 filters the received signal (as performed at step s6 above).

Figure 4:
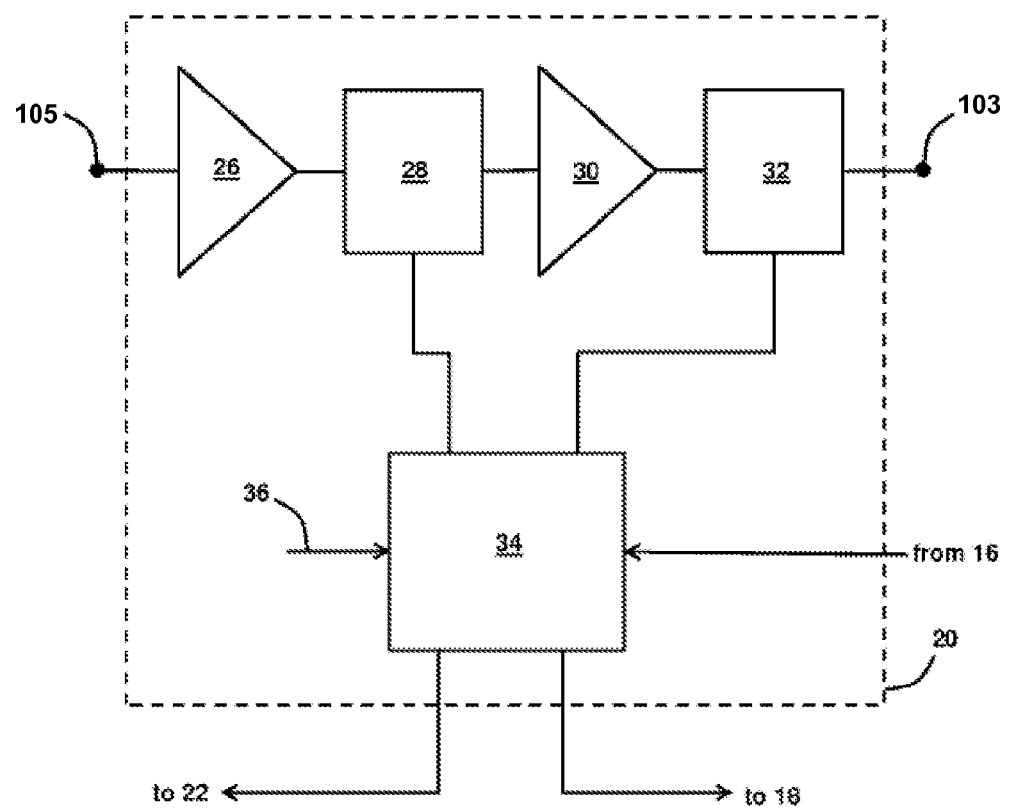
FIG. 4 is a schematic illustration (not to scale) of certain components of a typical filter module of a transceiver module.

FIG. 4 is a schematic illustration (not to scale) of certain components of the filter module 20 of this embodiment.

In this embodiment, the filter module 20 comprises a first low-noise amplifier (LNA) 26, a first filter 28, a second low-noise amplifier (LNA) 30, a second filter 32, and a controller 34.

In this embodiment, a first coupling of the first LNA 26 is connected to the fifth contact 105 (of the second relay 22). Also, a second coupling of the first LNA 26 is connected to a first coupling of the first filter 28.

In this embodiment, in addition to the first coupling of the first filter 28 being connected to the first LNA 26 (as described above), a second coupling of the first filter 28 is connected to a first coupling of the second LNA 30.

In this embodiment, in addition to the first coupling of the second LNA 30 being connected to the first filter 28 (as described above), a second coupling of the second LNA 30 is connected to a first coupling of the second filter 32.

In this embodiment, in addition to the first coupling of the second filter 32 being connected to the second LNA 30 (as described above), a second coupling of the second filter 28 is connected to the third contact 103 (of the first relay 18).

The first filter 28 and the second filter 32 are variable frequency filters.

The first filter 28 and the second filter 32 are each connected to the controller 34 such that each of the first and second filters 28, 32 can receive a control signal from the controller 34 as described in more detail later below with reference to FIGS. 6 to 9.

In this embodiment, in operation the controller 34 receives an input signal, hereinafter referred to as "the controller input". The controller input is indicated in FIG. 4 by the reference numeral 36.

In this embodiment, the controller input 36 comprises a plurality of different signals from a plurality of different sources. Examples of such signals and sources include: a Push-To-Transmit (PTT) signal from the pilot of the aircraft 2, tuning data, data corresponding to whether wide-band or narrow-band communication is to be implemented, and blanking data.

In this embodiment, the PTT signal is a discrete signal that originates at the transceiver 14.

In this embodiment, tuning data is a serial data stream that supports fast frequency hopping modes.

In this embodiment, the data corresponding to whether wide- or narrow-band communication is to be implemented is a discrete input and is determined by the wider operational configuration of the radio system under consideration.

In this embodiment, the controller 34 receives a signal from the power sensor 16. This signal is a sample of the signal to be transmitted. Using this sample signal, the controller 34 determines the frequency and power of a signal being transferred between the first relay 18 and the transceiver 14 as described in more detail later below with reference to FIGS. 6 to 9.

In this embodiment, the controller input 36 and the signal received by the controller 34 from the power sensor 16 is processed by the controller 34. Using these received signals, the controller 34 determines control signals for each of the first relay 18, the second relay 22, the first filter 28, and the second filter 32. The process by which these control signals are determined in this embodiment are described in more detail later below with reference to FIGS. 6 to 9.

The control signals determined by the controller 34 for the first relay 18 and the second relay 22 are signals that instruct the relays 18, 22 to operate in either their first mode or their second mode (i.e. in transmit or receive modes).

In other words, the control signal determined by the controller 34 for the first relay 18 specifies that either the first contact 101 is to be connected to the second contact 102, or that the first contact 101 is to be connected to the third contact 103. In this embodiment, Built In Test (BIT) functions are used to monitor the functionality of the filter module 20. If a fault condition that would compromise the integrity of the communications channel is detected, the controller 34 will set the first and second relays 18, 22 to transmit mode.

In other words, in this embodiment, if no fault has been detected the controller 34 will instruct the relays 18, 22 to operate in receive mode unless a signal is to be transmitted (i.e. the power sensor 16 provides a sample of a signal to be transmitted to the controller 34), in which case the controller 34 will instruct the relays 18, 22 to operate in transmit mode. If a fault is detected, the controller 34 will instruct the relays 18, 22 to operate in transmit mode.

Thus, in this embodiment, because a signal is being received at the first antenna 4 and transferred to the transceiver 14, the controller 34 instructs the relays 18, 22 to operate in receive mode, i.e. to be configured such that the received signal travels through the filter module 20. In other words, the control signal for the first relay 18 specifies that the first contact 101 is to be connected to the third contact 103, and the control signal for the second relay 22 specifies that the fifth contact 105 is to be connected to the sixth contact 106.

The control signals determined by the controller 34 for the first filter 28 and the second filter 32 are signals that instruct the filters 28, 32 how to filter a signal passing through them, as described in more detail later below with reference to FIGS. 6 to 9.

Thus, the control signals for the filters 28, 32 specify how the filters 28, 32 are to be tuned.

Any appropriate tuning method (i.e. method for determining the control signals for the filters 28, 32) may be used. For example, one or more of the following filter tuning methods may be used:

(i) a method allowing control from a parent radio via a radio dedicated Manchester logic tuning bus. Possible radios include radios from the following ranges: Selex (SRT651), Rockwell Collins (ARC210), Raytheon (ARC231);

(ii) a spot tuning method, for example, in which detection of the transmit frequency carrier for simplex operation is performed. This method could be used, for example, when no tuning bus is available from a parent radio typically using the filter power sensor function; and/or (iii) a programmable tuning method, for example, a method allowing prior external programming of the controller 34 to enable offset receive channels when used in a duplex role. This could, for example, be enabled by, in effect, "telling" a filter 28, 32 that it is in duplex mode, and then waiting for the transmit carrier to apply a pre-determined offset stored in a look-up table accessible by the controller 34.

Figure 5:
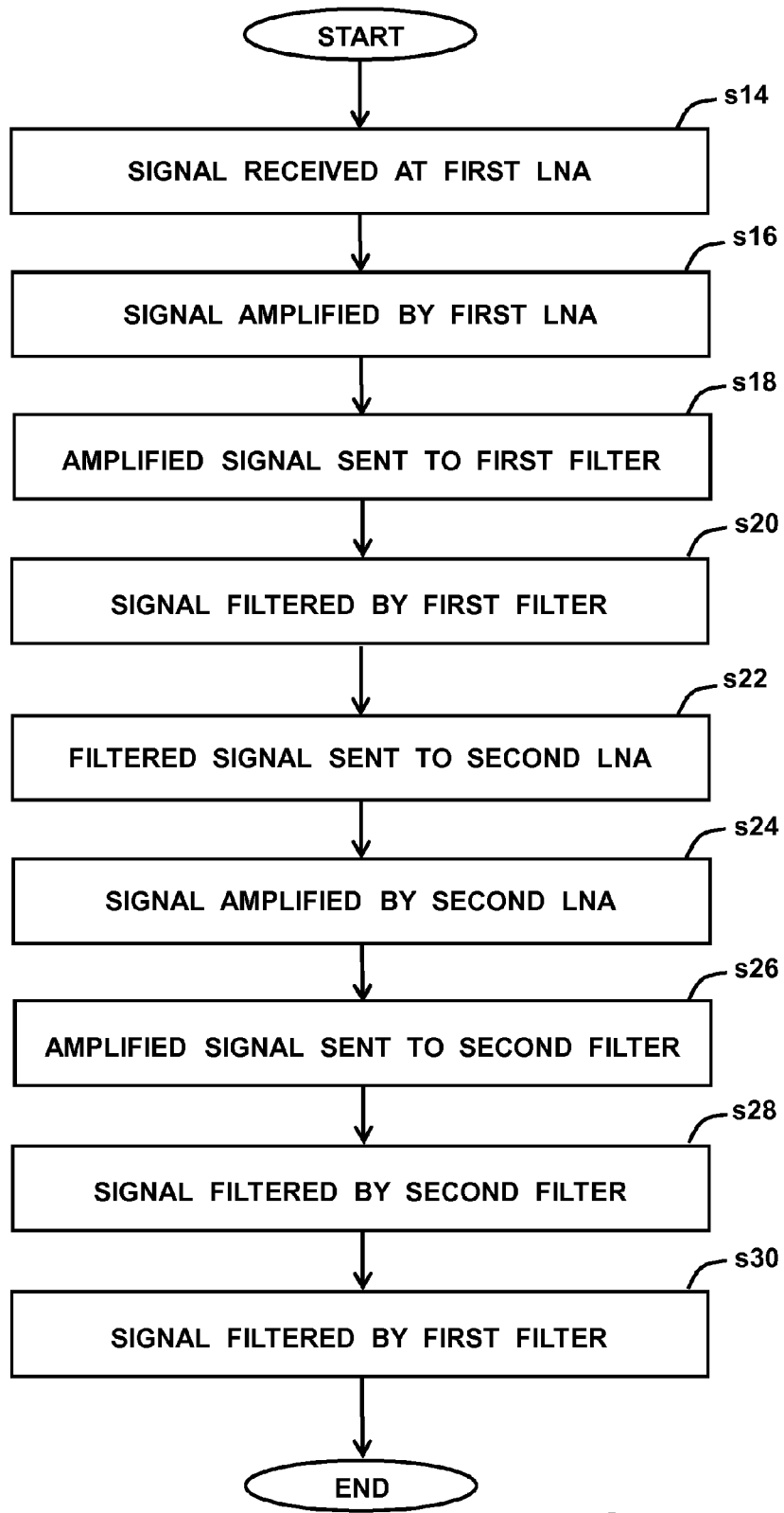
FIG. 5 is a process flow-chart showing certain steps of a process by which a signal is filtered by the filter module.

FIG. 5 is a process flow-chart showing certain steps of a process by which the signal received at the filter module 20 is filtered in this embodiment.

At step s14, the signal corresponding to the RF signal received at the first antenna 4 is received by the first LNA 26.

At step s16, the first LNA 26 amplifies the received signal.

At step s18, the amplified signal, produced by performing step s16 above, is sent to from the first LNA 26 to the first filter 28.

At step s20, the first filter 28 processes the received signal. In this embodiment, the signal is filtered by the first filter 28 according to the control signal sent from the controller 34 to the first filter 28. This process largely removes the unwanted received signals from the wanted signal. The process by which the controller 34 determines the control signal to be sent to the first filter 28 is explained in more detail later below with reference to FIGS. 6 to 9.

At step s22, the filtered signal, produced by performing step s20 above, is sent to from the first filter 28 to the second LNA 30

At step s24, the second LNA 30 amplifies the received signal. This stage of amplification advantageously tends to provide a degree of uniformity of signal level for subsequent stages.

At step s26, the amplified signal, produced by performing step s24 above, is sent to from the second LNA 30 to the second filter 32.

At step s28, the second filter 32 further processes the received signal. In this embodiment, the signal is filtered by the second filter 32 according to the control signal sent from the controller 34 to the second filter 32 and tends to produce a more refined receiver signal than the previous stage by further removing unwanted signals and noise. The process by which the controller 34 determines the control signal to be sent to the second filter 32 is explained in more detail later below with reference to FIGS. 6 to 9.

At step s30, the filtered signal, produced by performing step s28 above, is output from the second filter 32. In this embodiment, this signal is sent to the third contact 103.

Figure 6:
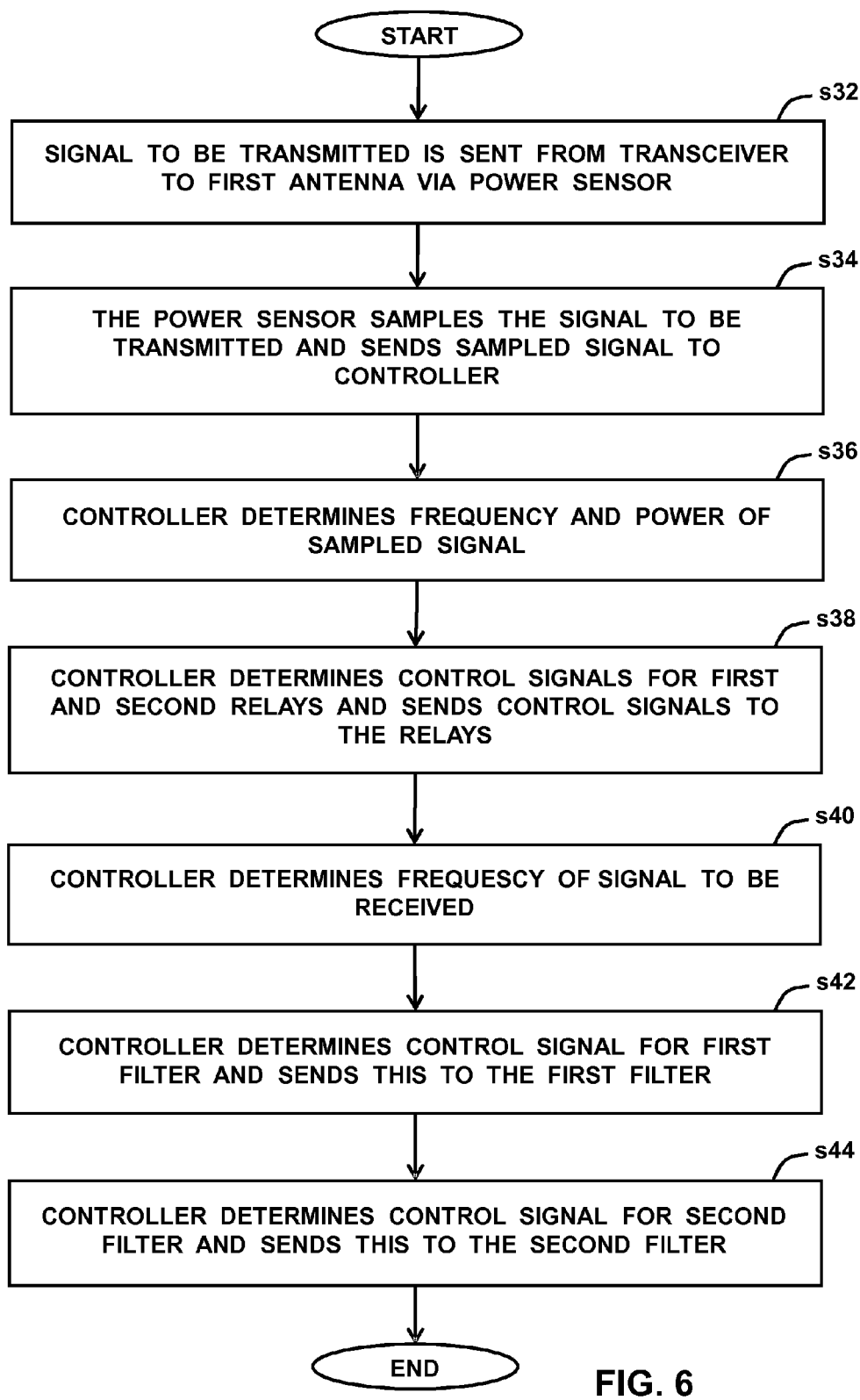
FIG. 6 is a process flow-chart showing certain steps of a process by which a controller determines control signals to be sent to a first filter and a second filter, and by which a received signal is filtered depending on those control signals.

FIG. 6 is a process flow-chart showing certain steps of a process by which the controller 34 determines control signals to be sent to first filter 28 and the second filter 32, and by which a received signal is filtered depending on these control signals.

In this embodiment, at a point in time before an RF signal is received at the first antenna 4, a signal originating at the first transceiver module 8 is transmitted from the first antenna 4.

At step s32, the signal to be transmitted at the first antenna 4 is sent from the transceiver 14 to the first antenna 4 via the power sensor 16.

At step s34, the power sensor 16 samples the signal to be transmitted. The signal is sampled along the connection between the transceiver 14 and the first relay. The signal sample is sent from the power sensor 16 to the controller 34 of the filter module 20. This signal sample is indicative of the output power and the frequency of the signal to be transmitted.

At step s36, the controller 34 receives the sampled signal from the power sensor 16 and determines the frequency of the signal to be transmitted. Also, using the sample signal, the controller 34 determines the output power of the signal to be emitted from the first antenna 4.

In this embodiment, the frequency of the signal to be transmitted is determined by the controller 34 using a voltage controlled oscillator (VCO).

Figure 7:
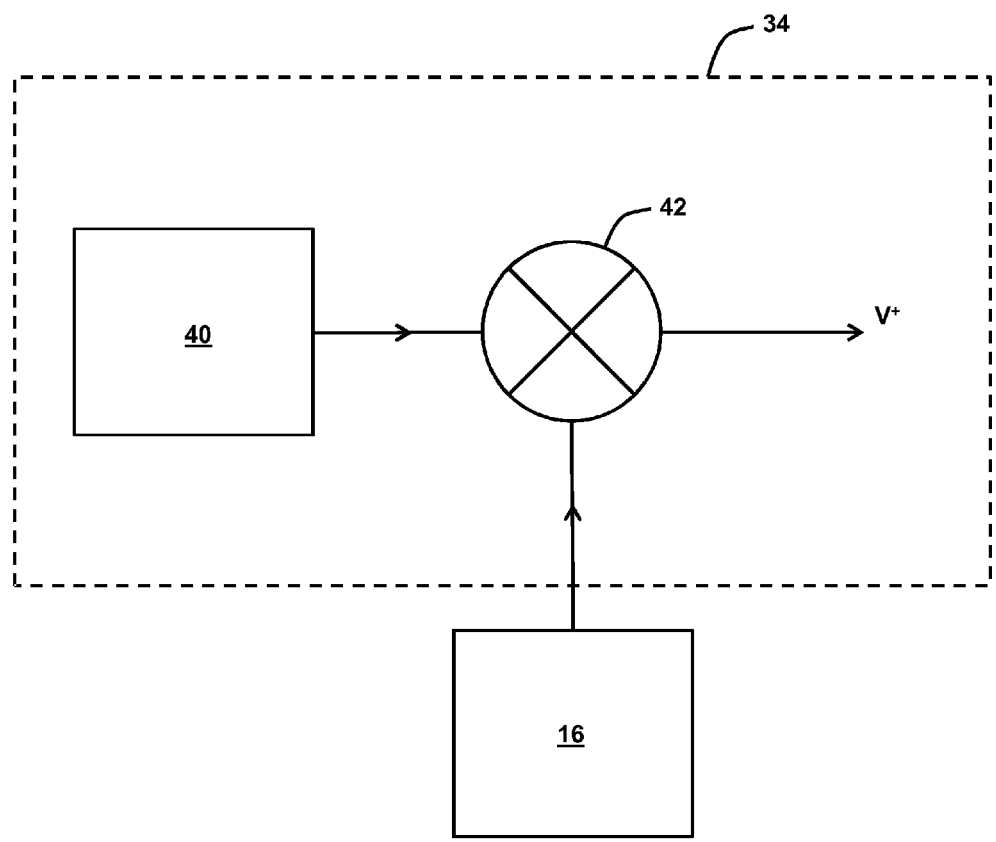
FIG. 7 is a schematic illustration (not to scale) showing how a voltage controlled oscillator is used to determine the frequency of a signal to be transmitted.

FIG. 7 is a schematic illustration (not to scale) showing how a VCO 40 is used to determine the frequency of the transmitted signal in this embodiment.

In this embodiment, the VCO 40 outputs a signal. The frequency of this signal is swept across a frequency range. This VCO signal is sent from the VCO 40 to a multiplier 42. The multiplier 42 multiplies the VCO signal and the sample signal from the power sensor 16. The multiplier outputs a positive voltage V+ when the frequency of the signal from the VCO 40 and the frequency of the sample signal are substantially equal. This positive voltage V=is measured. Thus, the frequency of the sample signal (and hence the signal to be transmitted at the first antenna 4) is determined.

At step s38, in response to the determination of the power of the signal to be transmitted, the controller 34 determines that the first and second relays 18, 22 are to be operating in transmit mode, i.e. that the signal to be transmitted is to pass along the by-pass 24. Corresponding control signals are generated by the controller 34 and sent to the relays 18, 22 instructing them to operate in transmit mode. In other words, because a sample signal from the power sensor 16 has been received by the controller 34, the controller determines that a signal is to be transmitted at the first antenna 4, and instructs the first and second relays 18, 22 to operate in transmit mode.

In this embodiment, during operation and when no fault has been detected, the power sensor 16 only samples a signal that is to be transmitted from the first antenna 4, i.e. which originates from the transceiver 14. Signals received at the first antenna 4 and that are passed to the transceiver 14 are not sampled by the power sensor 16. In operation, when no signal is sampled by the power sensor 16, no sampled signal is received at the controller 34 and consequently the controller 34 determines that the first and second relays 18, 22 are to operate in receive mode. Thus, in this embodiment, during operations and if no fault has been detected, the relays 18, 22 of the module 8 operate in transmit mode only if a signal is to be transmitted, and operate in receive mode at other times (i.e. when a signal is not to be transmitted). However, as described in more detail later below, when it is determined that a fault is present, the relays 18, 22 are set to operate in transmit mode at all times, thereby keeping a channel of communication (albeit an unfiltered one) open.

At step s40, in response to the determination of the frequency of the signal to be transmitted, the controller 34 determines a value of a frequency of a corresponding received signal (e.g. the frequency of a signal received in response to the transmitted signal).

In this embodiment, the frequency of a received signal is equal to the frequency of the transmitted signal (i.e. the sampled signal). Thus, the operation of the first transceiver module is Simplex. However, in other embodiments, the frequency of the received signal may be of a different value that depends on the frequency of the transmitted signal. Thus, the operation of the first transceiver module would be Duplex. For example, the frequency of a received signal may be determined by looking-up (e.g. in a table) a "receive frequency" that corresponds to a particular determined transmit frequency.

At step s42, the controller 34 determines a control signal for the first filter 28 depending on the frequency of the signal to be received at the first antenna 4 (determined at step s40 above). This control signal is sent from the controller 34 to the first filter 28.

In this embodiment, the control signal determined by the controller 34 for the first filter 28 instructs the first filter 28 to filter a received signal depending on the frequency determined at step s40 above. Thus, in this way the controller 34 tunes the first filter 28.

Figure 8:
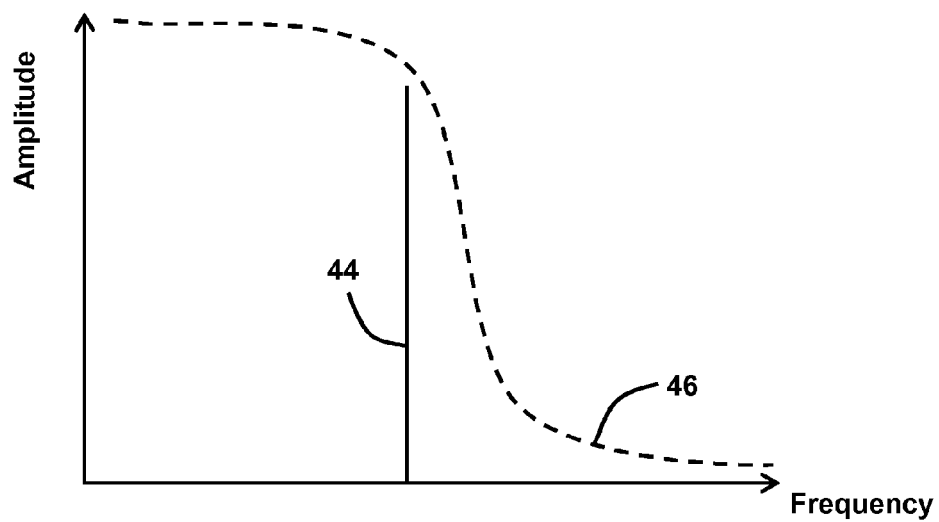
FIG. 8 is a schematic illustration (not to scale) showing how the first filter filters a received signal.

FIG. 8 is a schematic illustration (not to scale) showing how the first filter 28 filters the received signal. The frequency of the received signal (determined at step s40 above) is indicated in FIG. 8 by a solid line and the reference numeral 44. In this embodiment, the first filter 28 is a low-pass filter. The filtering applied to a received signal by the first filter 28 is indicated in FIG. 8 by a dotted line and the reference numeral 46. Thus, in this embodiment, the control signal received by the first filter 28 from the controller 34 instructs the first filter 28 to filter signals received at the first antenna 4 such that signal components having a frequency less than the determined receive frequency 44 are unaltered, whereas signal components having a frequency more than the determined receive frequency 44 are substantially removed.

At step s44, the controller 34 determines a control signal for the second filter 32 depending on the frequency of the signal to be received at the first antenna 4 (determined at step s40 above). This control signal is sent from the controller 34 to the second filter 32.

In this embodiment, the control signal determined by the controller 34 for the second filter 32 instructs the second filter 32 to filter a received signal depending on the frequency determined at step s40 above. Thus, in this way the controller 34 tunes the second filter 32.

Figure 9:
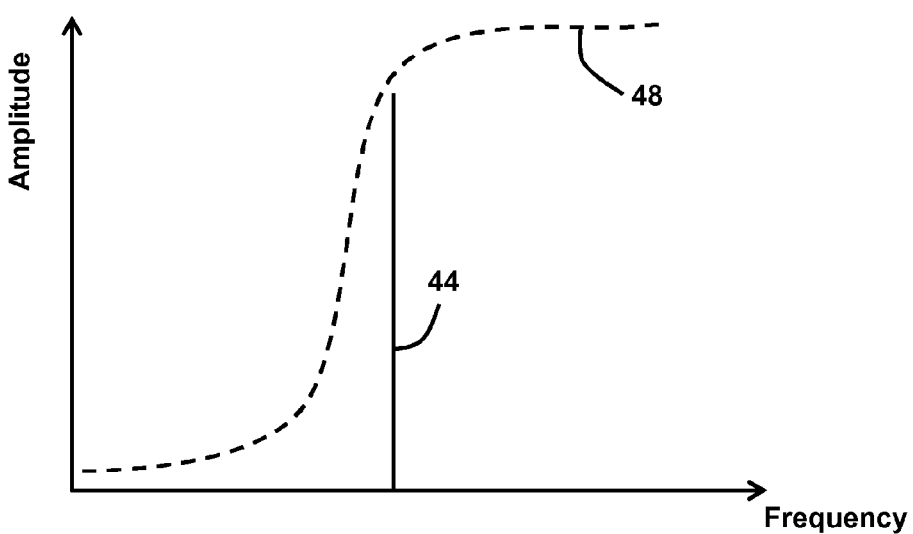
FIG. 9 is a schematic illustration (not to scale) showing how the second filter filters the received signal.

FIG. 9 is a schematic illustration (not to scale) showing how the second filter 32 filters the received signal. The frequency of the received signal (determined at step s40 above) is indicated in FIG. 9 by a solid line and the reference numeral 44. In this embodiment, the second filter 32 is a high-pass filter. The filtering applied to a received signal by the second filter 32 is indicated in FIG. 9 by a dotted line and the reference numeral 48. Thus, in this embodiment, the control signal received by the second filter 32 from the controller 34 instructs the second filter 32 to filter signals received at the first antenna 4 such that signal components having a frequency more than the determined receive frequency 44 are unaltered, whereas signal components having a frequency less than the determined receive frequency 44 are substantially removed.

Thus, in combination, the first and second filters 28, 32 advantageously tend to remove signal components having frequencies above and below that of the determined frequency of the received signal.

This completes the description of the process of FIG. 6.

The first and second filters 28, 32 may advantageously be "tuned" such that a component of the received signal having a particular frequency may be substantially isolated. The filters 28, 32 tend to be able to be adapted depending on the frequency of a received signal.

In this embodiment, at the same time that the first antenna 4 and first transceiver module 8 is receiving and processing an RF signal, the second antenna 6 and second transceiver module 10 are transmitting a signal.

In this embodiment, each transceiver module 8, 10 is arranged to operate at 28 VDC.

In this embodiment, the antenna 4, 6 each have a typical impedance of 50 Ohms.

In this embodiment, a transceiver module 8, 10 reverts to using the by-pass path 24 (i.e. the relays of the transceiver module 8, 10 operate in "transmit mode", by-passing the respective filter module) if an internal fault is detected. This advantageously tends to provide that the radio is allowed to communicate without Simultaneous Operation (SimOp) protection such that the communication channel is maintained if a fault is detected. Also, an external indication is visible (e.g. to the pilot of the aircraft 2) when the system is operating in this condition. In this embodiment, the filter module 20 has included self-test processes that monitor the correct functionality of the system. Built In Test (BIT) routines that provide this functionality are controlled by the controller 34. For example, the controller 34 may initiate its own R.F test signal and 'injects' it at the first LNA 26. The controller 34 then assesses the output at the first LNA 26 and compares it against pre-determined threshold levels for pass/fail. In the event of a 'fail' being detected, the controller 34 instructs the relays 18, 22 to operate in "transmit" mode, thereby providing a communications channel.

In this embodiment, the filter module 20 operates between 30 MHz and 512 MHz. This frequency range advantageously encompasses the tactical VHF band. However, in other embodiments, the filter module 20 is arranged to operate for a different range of frequencies, for example 118 MHz to 512 MHz.

An advantage provided by the above described system a process is that the detrimental effects of receiver desensitisation caused by the receiver antenna being in the vicinity of the transmitter antenna tend to be reduced or alleviated.

Thus, the use of a plurality of transmitting and receiving co-site antennas tends to be facilitated. Furthermore, the need for increasing antenna isolation by means of platform re-design tends to be reduced or eliminated.

The above described system tends to protect receivers only. Thus, the size, weight and power requirements of the system tend to be significantly lower than in conventional systems. This tends to provide that the system is useable in a large number of different situations. For example, the system tends to be useable in a variety of air vehicles (e.g. UAVs), marine and land vehicles. Moreover, the provided system advantageously tends to be useable on vehicles with which conventional filtering systems may not be used, e.g. vehicles in which space, weight, and/or cost restrictions would prohibit the use of conventional filtering systems.

A further advantage provided by the above described system is that the system is modular. This tends to provide that any transceiver module in the vehicle may be updated, replaced, or changed independently of the other modules in the vehicle. Also, a filter module in any transceiver module may be updated, replaced, or changed independently of the other modules.

Also, the above described system tends to be relatively simple and easy to operate. Moreover, installation of the above described system tends to be relatively easy. Indeed, installation of a transceiver module tends to only require connecting the module to an antenna and a power supply (e.g. a 28 VDC power supply) and if required, any requisite tuning busses and/or platform radio discretes.

A further advantage provided by the above described system and method is that the adaptive filtering tends to enhance receiver performance by improving R.F isolation.

Receiver reliability also tends to benefit by limiting the receiver R.F power at the receiver input stage by means of filter buffering.

Apparatus, including the controller, for implementing the above arrangement, and performing the method steps described above with reference to FIGS. 3, 5 and/or 6, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the flowcharts of FIGS. 3, 5 and/or 6 and described above may be omitted or such process steps may be performed in differing order to that presented above and shown in the Figures. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the transceiver modules are implemented on a manned aircraft. However, in other embodiments the transceiver modules are implemented on a different type of vehicle, for example an autonomous or semi-autonomous aircraft, or a manned or unmanned land-based or water-based vehicle. Also, in other embodiments, the transceiver module may be implemented on a different type of entity other than a vehicle, e.g. a building.

In the above embodiments, the aircraft comprises two antennas, each being connected to a transceiver module. However, in other embodiments the vehicle comprises a different number of antennas and transceiver modules.

In the above embodiments, RF signals are received by the antennas and processed by the transceiver modules. However, in other embodiments one or more of the antennas may be arranged to receive and/or transmit a different type of signal. Also, the transceiver module connected to such a different type of antenna is arranged to provide and/or receive (and filter) a relevant different type of signal.

In the above embodiments, each transceiver module comprises a transceiver. However, in other embodiments one or more of the transceiver modules may comprise either a transmitter or a receiver instead of or in addition to the transceiver. For example, in other embodiments, one or more of the transceiver modules comprises a receiver instead of a transceiver. However, such modules are not capable of providing signals for transmission, only receiving and filtering signals. In such embodiments, the by-pass path may be used in the presence of a fault.

In the above embodiments, each transceiver module comprises a controller. However, in other embodiments the filters and/or relays of one or more of the transceiver modules are controlled by a common controller. However, such systems are not fully modular. In other embodiments, one or more controllers are remote from the transceiver or filter modules.

In the above embodiments, a filter module comprises two LNAs and two filters. These components are arranged such that a signal being filtered by a filter module is processed by the components in the following order: LNA, filter, LNA, filter. However, in other embodiments the components of the filter module are arranged so that a signal being processed is processed by the components in a different order. Also, in other embodiments the filter module comprises a different number of LNAs and/or a different number of filters. These components may be arranged to process a signal in any appropriate order.

In the above embodiments, the received and filtered signal is transferred to the pilot of the aircraft. However, in other embodiments the received and filtered signal may be sent to a different system to be processed or used in a different way.

In the above embodiments, the protection module provides RF interference protection against remotely derived RF interference, for example, a remote but co-located radio transmitter i.e. a source that is not electronically connected to or integrated with the device to be protected.

What is claimed is:

1. A method of processing radio frequency signals, the method comprising:
    in a first transceiver module, obtaining a signal indicative of a first frequency, the first frequency being a frequency of a first signal the first signal being a transmitted signal; and
    using the signal indicative of a first frequency, determining a second frequency depending on the first frequency;
    tuning a filter in a second transceiver module, to the second frequency;
    receiving a second signal at a receiver antenna for the second transceiver module: and
    filtering, by the filter, the received second signal to:
        remove, from the second signal, components having a frequency greater than the second frequency; and
        remove, from the second signal, components having a frequency less than the second frequency;
    wherein each of the first transceiver module and the second transceiver module comprises substantially the same type of components, and each module is independent, wherein each module can be changed independently of the other module.

2. The method of claim 1, further comprising:
    establishing a first path from a transceiver to a transmission antenna that bypasses the filter;
    sending, from the transceiver to the transmission antenna via the first path, the first signal; and
    transmitting, from the transmission antenna, the first signal.

3. The method of claim 2, wherein
    the method further comprises determining an output power for the first signal: and
    the step of establishing the first path is performed by a controller responsive to determining the output power.

4. The method of claim 3, wherein the step of determining the output power of the first signal comprises the controller obtaining a sample of the first signal and using the sample signal to determine the output power.

5. The method of claim 2, wherein the step of receiving the second signal is performed after the transmission of the first signal and comprises:
    establishing a second path from the receive antenna to the transceiver, the filter being along the second path; and
    receiving, by the filter via at least part of the second path, the second signal.

6. The method of claim 5, wherein establishing the second path is performed by a controller responsive to not receiving a sample of the first signal.

7. The method of claim 1, wherein determining the second frequency comprises:
    using a voltage controlled oscillator, generating a signal having variable frequency swept across a frequency range;
    using a multiplier, multiplying the signal generated by the voltage controlled oscillator and the signal indicative of a first frequency; and
    determining the first frequency depending on an output from the multiplier.

8. The method of claim 1, comprising:
    emitting the transmitted signal from a transmission antenna, wherein the step of obtaining a signal indicative of a first frequency is performed prior to the transmitted signal being emitted from the transmission antenna.

9. The method according to claim 2 comprising:
    receiving a signal at a receiver antenna which is a same antenna as the transmission antenna.

10. The method of claim 1, wherein an antenna is a co-site antenna with respect to at least one other antenna.

11. The method of claim 1, comprising:
    performing a fault detection process; wherein the step of filtering the received signal using the filter is only performed if no fault is detected.

12. Apparatus for processing radio frequency signals, the apparatus comprising:
    a first transceiver module obtaining a signal indicative of a first frequency the first frequency being a frequency of a first signal, the first signal being a transmitted signal; and
    means for, using the signal indicative of a first frequency, determining a second frequency depending on the first frequency;
    in a second transceiver module tuning a filter to the second frequency;
    a receiver antenna configured to receive a second signal; and
    a filter, in the second transceiver module, configured to:
        remove, from the second signal, components having a frequency greater than the second frequency; and
        remove, from the second signal, components having a frequency less than the second frequency;
    wherein each of the first transceiver module and the second transceiver module comprises substantially the same type of components, and each module is independent, wherein each module can be changed independently of the other module.

13. The apparatus of claim 12, wherein the filter is tuned depending on the second frequency.

14. A machine readable non-transitory storage medium for storing of a program or at least one of the plurality of programs arranged such that when executed by a computer system or one or more processors it/they cause the computer system or the one or more processors to operate in accordance with the method of claim 1.

15. A radio system for processing radio frequency signals comprising:
    a first and a second transceiver module, each coupled to an antenna; wherein each of the first transceiver module and the second transceiver module is independent, wherein each module can be changed independently of the other module;
    each of the transceiver modules comprising
    a transceiver; and
    a protection module;

the protection module directly coupled between the transceiver and the antenna;
the protection module comprising
   a power sensor;
   a first relay;
   a filter module; and
   a second relay;
   wherein the transceiver is directly coupled to the power sensor,
   the power sensor is directly coupled to the first relay and the filter module,
   the first relay is directly coupled to the filter module and the second relay,
   the filter module is directly coupled to the second relay, and
   the second relay is directly coupled to the antenna;
obtaining a signal indicative of a first frequency by the first transceiver module, the first frequency being a frequency of a first signal the first signal being a transmitted signal; and
using the signal indicative of a first frequency, determining a second frequency depending on the first frequency;
tuning the filter module of the second transceiver module to the second frequency;
receiving a second signal at the receiver antenna of the second transceiver module: and
filtering, by the filter module of the second transceiver module, the received second signal to:
   remove, from the second signal, components having a frequency greater than the second frequency; and
   remove, from the second signal, components having a frequency less than the second frequency.

16. The system of claim 15, wherein the filter module comprises:
   a controller receiving a controller input and input from the power sensor;
   a first filter directly coupled to the controller;
   a second filter directly coupled to the controller;
   a first low noise amplifier (LNA) directly coupled between the first filter and a fifth contact of a second relay;
   a second LNA directly coupled between the first and second filters;
   the second filter directly coupled to a third contact of a first relay; and
   the controller directly coupled to the first relay and the second relay.

* * * * *